United States Patent
Lim et al.

(10) Patent No.: US 8,024,722 B2
(45) Date of Patent: Sep. 20, 2011

(54) METHOD AND SYSTEM FOR AUTOMATIC INSTALLATION OF A FUNCTIONAL UNIT DRIVER ON A HOST

(75) Inventors: Lay Chuan Lim, Singapore (SG); Chin Shyan Raymond Ooi, Singapore (SG); Teng Pin Poo, Singapore (SG); Henry Tan, Singapore (SG)

(73) Assignee: Trek 2000 International Ltd, Singapore (SG)

( * ) Notice: Subject to any disclaimer, the term of this patent is extended or adjusted under 35 U.S.C. 154(b) by 1256 days.

(21) Appl. No.: 11/660,044

(22) PCT Filed: Aug. 12, 2004

(86) PCT No.: PCT/SG2004/000242
§ 371 (c)(1),
(2), (4) Date: Feb. 12, 2007

(87) PCT Pub. No.: WO2006/016852
PCT Pub. Date: Feb. 16, 2006

(65) Prior Publication Data
US 2007/0271558 A1 Nov. 22, 2007

(51) Int. Cl.
*G06F 9/445* (2006.01)
(52) U.S. Cl. ........ 717/169; 717/170; 717/171; 717/175; 717/176
(58) Field of Classification Search .......................... None
See application file for complete search history.

(56) References Cited

U.S. PATENT DOCUMENTS

| 6,754,725 | B1 | 6/2004 | Wright et al. |
| 2002/0004852 | A1 | 1/2002 | Sadovsky et al. |
| 2002/0188938 | A1 | 12/2002 | Dong et al. |
| 2003/0084132 | A1 | 5/2003 | Ohta |
| 2003/0131147 | A1 | 7/2003 | Wilt et al. |
| 2003/0204950 | A1 | 11/2003 | Chou et al. |
| 2003/0212838 | A1 | 11/2003 | Yen et al. |
| 2004/0128420 | A1 * | 7/2004 | Su et al. .......................... 710/302 |

FOREIGN PATENT DOCUMENTS

| EP | 1434128 A | 11/2000 |
| EP | 1179783 | 2/2002 |
| WO | WO03012577 A | 2/2003 |

OTHER PUBLICATIONS

Non-Final Rejection for KR 10-2007-70005651 issued by the Korean Intellectual Property Office, Dec. 14, 2010, and translation thereof.

* cited by examiner

*Primary Examiner* — Chuck O Kendall
(74) *Attorney, Agent, or Firm* — Jacobson Holman PLLC

(57) ABSTRACT

A method for automatic loading to a host of a functional unit driver stored as part of an executable program on a memory of a first functional unit, the method comprising physically connecting the first functional unit to the host and the first functional unit reporting itself to the host as being a generic storage device to make use of a generic mass storage class driver in the host. An operating system of the host reads an autorun file forming part of the executable program to load and execute on the host a driver set up program forming a part of the executable program. The host uses the driver set up program as executed on the host to install and execute the functional unit driver on the host.

23 Claims, 9 Drawing Sheets

METHOD AND SYSTEM FOR AUTOMATIC INSTALLATION OF A FUNCTIONAL UNIT DRIVER ON A HOST

This is a national stage of PCT/SG04/000242 filed Aug. 12, 2004 and published in English.

FIELD OF THE INVENTION

This invention relates to a method and system for the automatic installation of a functional unit driver on a host and refers particularly, though not exclusively, to such a method and system for installing functional unit drivers on a host computer.

BACKGROUND TO THE INVENTION

"Plug and Play" is a combination of hardware and software that enables a computer system to recognize and adapt to hardware configuration changes with little or no user intervention. With "Plug and Play", peripheral and other devices may be added or removed dynamically, without awkward and confusing manual configuration, and without an intricate knowledge of computer hardware.

In order to install or use a peripheral or other device without an external driver, the peripheral or other device must conform to at least one of a number of specific classes. Operating systems such as, for example, "Windows" 2000 must pre-load the corresponding class driver. With the class driver preloaded, the operating system may then perform the following tasks:

(a) automatic and dynamic recognition of installed hardware including initial system installation, recognition of any "Plug and Play" hardware changes that have occurred since the last system boot, and response to run-time hardware events such as, for example, dock or undock and device insertion or removal; and (b) loading of appropriate drivers by the "Plug and Play" manager determining which drivers are required to support a particular functional unit and the loading of those drivers.

However, the driver only includes certain common and existing classes such as, for example, a generic mass storage class, a human interface device class, and a video class. A particular class driver may no longer be applicable if the functional unit manufacturer has added some new features. In this case the functional unit manufacturer may need to supply their own driver preloaded in a non-volatile memory such as a CDROM, or via the Internet. Without the driver the functional unit is not usable on the host, or any other host computer.

SUMMARY OF THE INVENTION

In accordance with a preferred aspect, there is provided a method for automatic loading to a host of a functional unit driver stored as part of an executable program on a memory of a first functional unit, the method comprising physically connecting the first functional unit to the host, the first functional unit reporting itself to the host as being a generic storage device to make use of a generic mass storage class driver in the host. An operating system of the host reads an autorun file forming part of the executable program to load and execute on the host a driver set up program forming a part of the executable program. The host uses the driver set up program as executed on the host to install and execute the functional unit driver on the host.

According to a second aspect there is provided a system for automatic loading to a host of a functional unit driver, the functional unit driver being stored as part of an executable program on a memory of a first functional unit connectable to the host. The executable program further comprising an autorun file for the loading and execution on the host of a driver set up program also forming a part of the executable program. The driver set up program is for execution on the host for the installation and execution of the functional unit driver on the host.

For both aspects the functional unit driver may be for the first functional unit or for a second functional unit connectable to the host, the first and second functional units being separate units. The first and second functional units may be connected to the host using the same system; the system being selected from the group consisting of: USB, IEEE1394, Bluetooth, IEEE 802.11(b), Wi-Max, and wireless USB.

After the loading and execution of the driver set up program on the host, the driver set up program may issue a command to the first functional unit to connect the second functional unit to the host. Upon receipt of the command the first functional unit may functionally connect the second functional unit to the host, and the operating system of the host may detect that the second functional unit has been connected, whereupon the functional unit driver for second functional unit is installed on the host from the first functional unit.

The first and second functional units may be physically connected to the host such that the host splits an allocation of one memory unit to two logical unit areas. Only the first functional unit may be visible to the operating system of the host prior to the execution of the driver set up program.

After the installation of the functional unit driver is complete, a command may be sent to the first functional unit and enumeration performed. The first and second functional units may be determined to be two separate logical units. The first functional unit may be allocated a first drive letter in the host, and the second functional unit may be allocated a second letter in the host.

A file system driver for the second functional unit may be automatically installed subsequent to the installation of the functional unit driver. The file system driver may also form a part of the executable program. The first functional unit may be allocated by the host as being a first drive and the second functional unit may be allocated by the host as being a removable drive.

The file system driver may be one of: encryption, compression, NT file system driver, Linux file system driver, and MAC extended file system driver. The first functional unit may be a non-volatile memory device comprising the memory. The second functional unit may be a peripheral device selected from: a monitor, a keyboard, at least one speaker, a mouse, a printer, a removable non-volatile memory device, a digital camera, a digital camera docking station, a projector, a wireless hub, a USB hub, a card reader, an MP3 player, a media player, an external disk drive, a video player, a games console, a scanner, a biometric input device, a musical instrument, and an external sound card. The host may be selected from: a personal computer, a server, a laptop computer, a notebook computer, a tablet computer, a personal digital assistant, and a computerized projector.

According to a final aspect, there is provided a removable non-volatile memory device for attachment to a host, the removable memory non-volatile device comprising a computer readable medium comprising a computer program code that is configured to cause at least one processor of the host to execute one or more functions to perform the above method.

BRIEF DESCRIPTION OF THE DRAWINGS

In order that the invention may be fully understood and readily put into practical effect, there shall now be described by way of non-limitative example only preferred embodiments of the present invention, the description being with reference to the accompanying illustrative drawings in which.

DETAILED DESCRIPTION OF THE PREFERRED EMBODIMENTS

Figure 1:
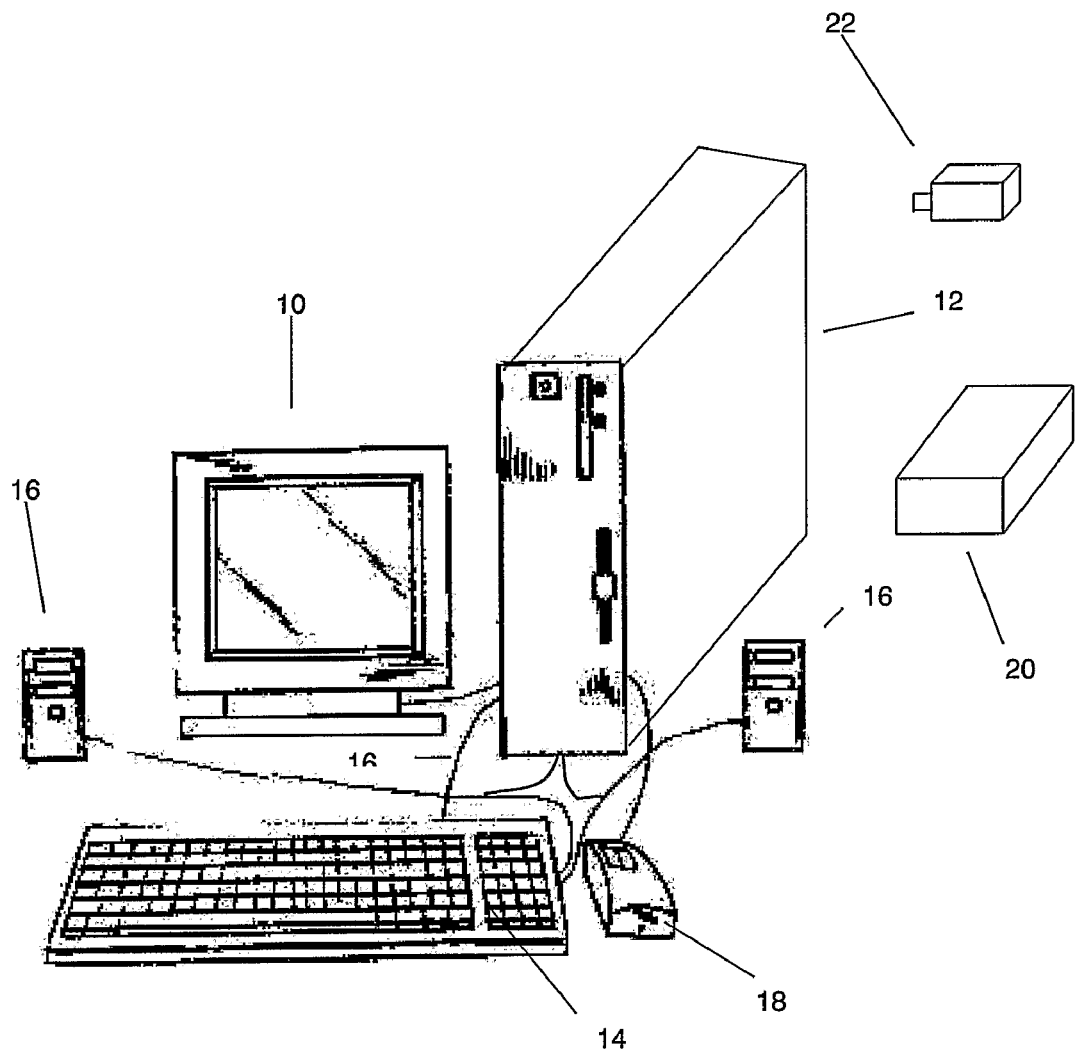
FIG. 1 is a schematic illustration of a computer system according to a first embodiment.

Throughout the drawings, like reference numerals are used for like components sometimes with a prefix number to indicate the embodiment concerned.

To refer to FIG. 1, there is shown a relatively normal computer system comprising a monitor 10, a host computer 12, a keyboard 14, a pair of speakers 16, a mouse 18, a printer 20, and a removable non-volatile memory device 22. Although a personal computer is shown, the present invention also applies to servers, laptop computers, notebook computers, tablet computers, personal digital assistants, computerized projectors, and any other computer-controlled device able to be a host for a peripheral device. Host 12 uses an operating system for its operation, and to control the functional units connected to it. Connection of the functional units may be by USB, IEEE1394, or wirelessly. Wireless may be by Bluetooth, IEEE 802.11(b) (WiFi), Wi-Max or wireless USB.

Each of the monitor 10, keyboard 14, pair of speakers16, mouse 18, printer 20, and removable non-volatile memory device 22 is a functional unit for use with host 12. Other functional units include, but are not limited to, digital cameras, digital camera docking stations, projectors, wireless hub, USB hub, card reader, MP3 player, media player, external disk drive, video player, games console, scanner, biometric input device, musical instrument, external sound card, and so forth. All such devices are termed a functional unit and are given the generic reference numeral 24.

Figure 2:
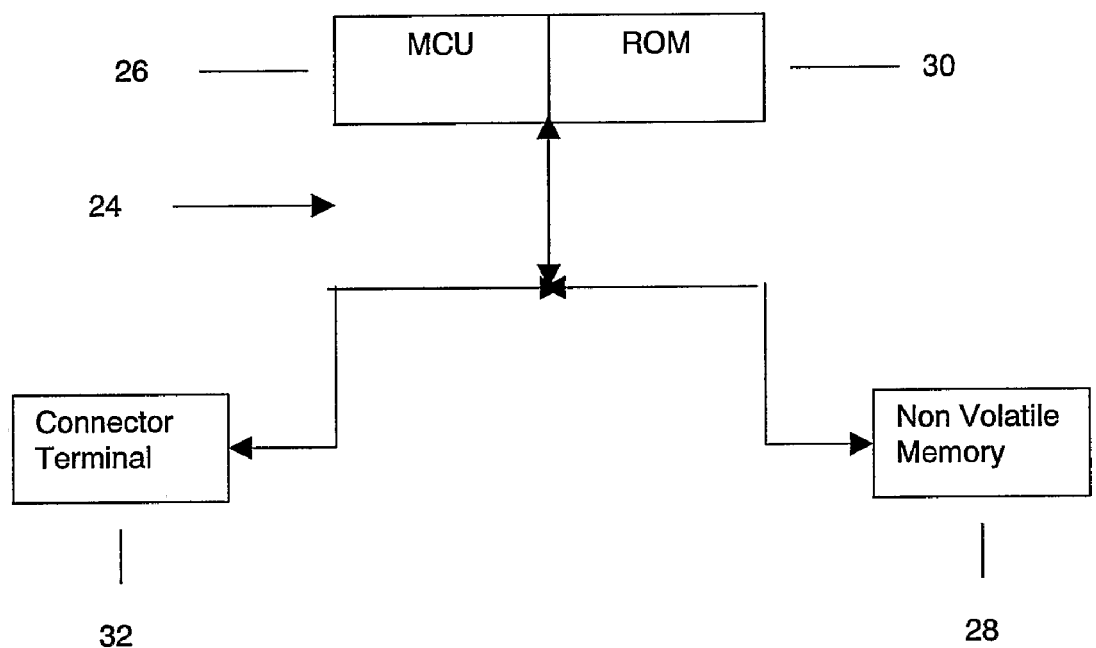
FIG. 2 is a schematic block diagram illustrating a functional unit of FIG. 1.

A schematic block diagram of such a functional unit is shown in FIG. 2. The functional unit 24 has a microprocessor unit 26 having an internal ROM 30. The operating system is loaded into ROM 30 for execution by microprocessor 26. A connector 32 may be USB, IEEE 1394, wireless, or otherwise. Wireless may be by Bluetooth, IEEE 802.11(b) (WiFi), Wi-Max or wireless USB. The unit 24 also has a non-volatile memory 28 of any known type including, but not limited to, flash memory, hard disk, CDROM, DVD, or the like. Memory 28 stores a driver for connector 32. The memory may be one or more modules, and may be:

(a) built-in to unit 24;
(b) separate from unit 24 but connectable to, or insertable into, unit 24; or
(c) separate from unit 24 but able to communicate with unit 24 via host 12 or another device.

Figure 3:
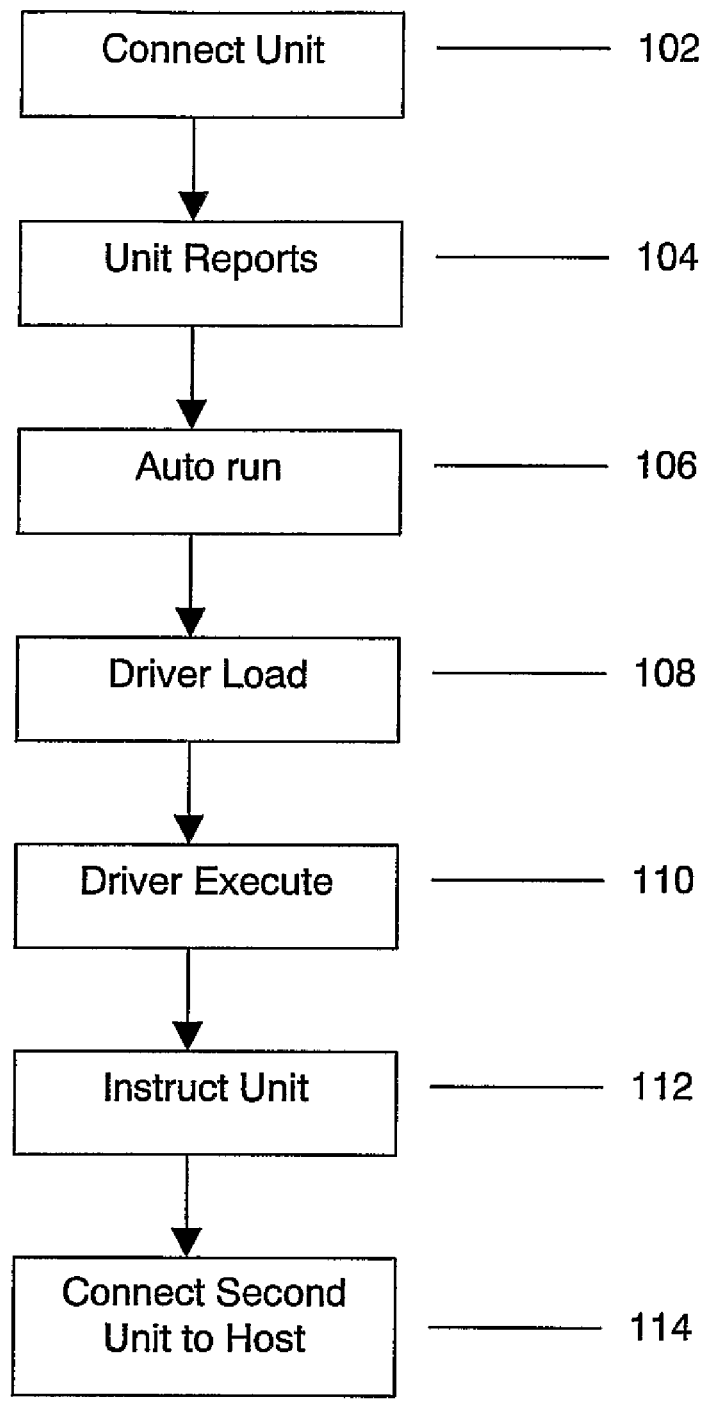
FIG. 3 is an overall flow chart for the operation of the first embodiment.

The installation of device 24 to host 12 is shown in FIG. 3 and is based on the "autorun" feature provided by most operating systems. The memory 28 stores the functional unit 24 driver as an executable program to be installed to the operating system of host 12. Also included in the executable program are other functionalities, as will be clear from the following description. Those functionalities will vary according to the particular circumstances.

When the functional unit 24 is connected to host 12 (102), the functional unit 24 reports itself to host 12 as being, for example, a generic storage device such as a CDROM device connected to host 12 via a known connecting system such as USB, and that makes use of the generic mass storage class driver in host 12 (104).

The operating system of host 12 will read the autorun.inf (106). Using the autorun.inf, the operating system of host 12 will load (108) and execute (110) the executable program that is preloaded in the memory 28. The executable program preferably includes, amongst others, a driver set up program, and a driver for the functional unit 24.

Figure 4:
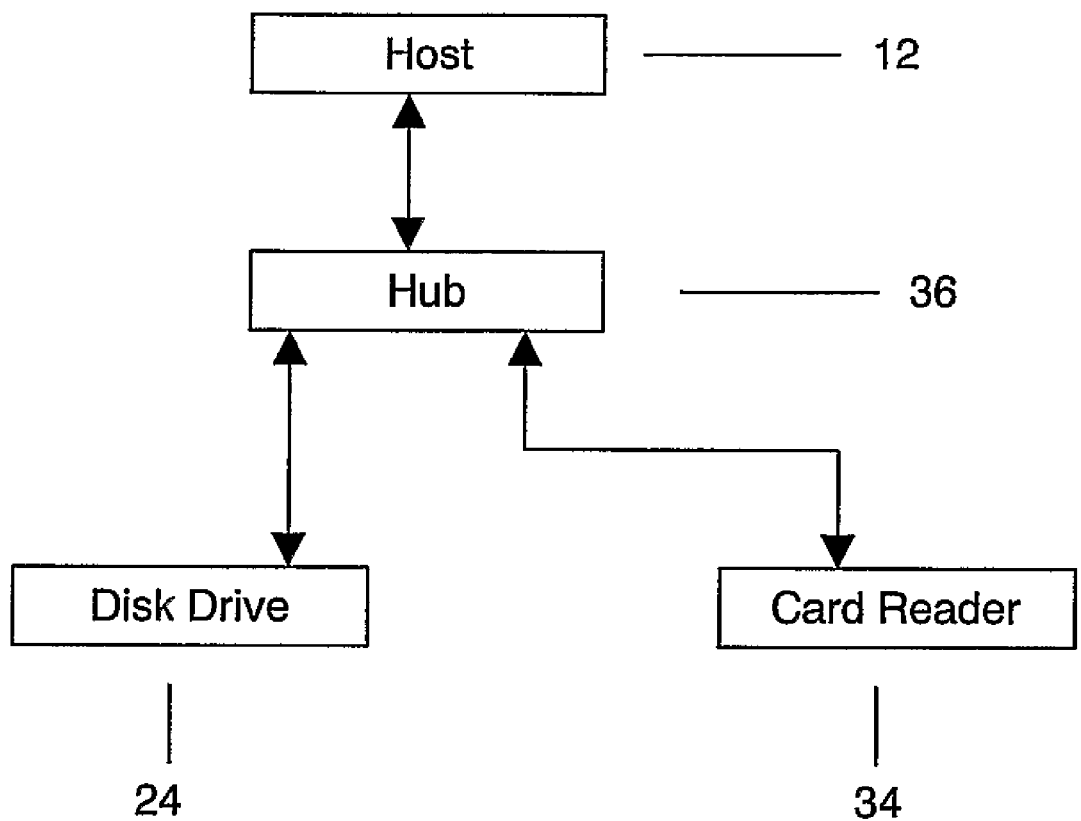
FIG. 4 is a schematic block diagram of a second embodiment.
Figure 5:
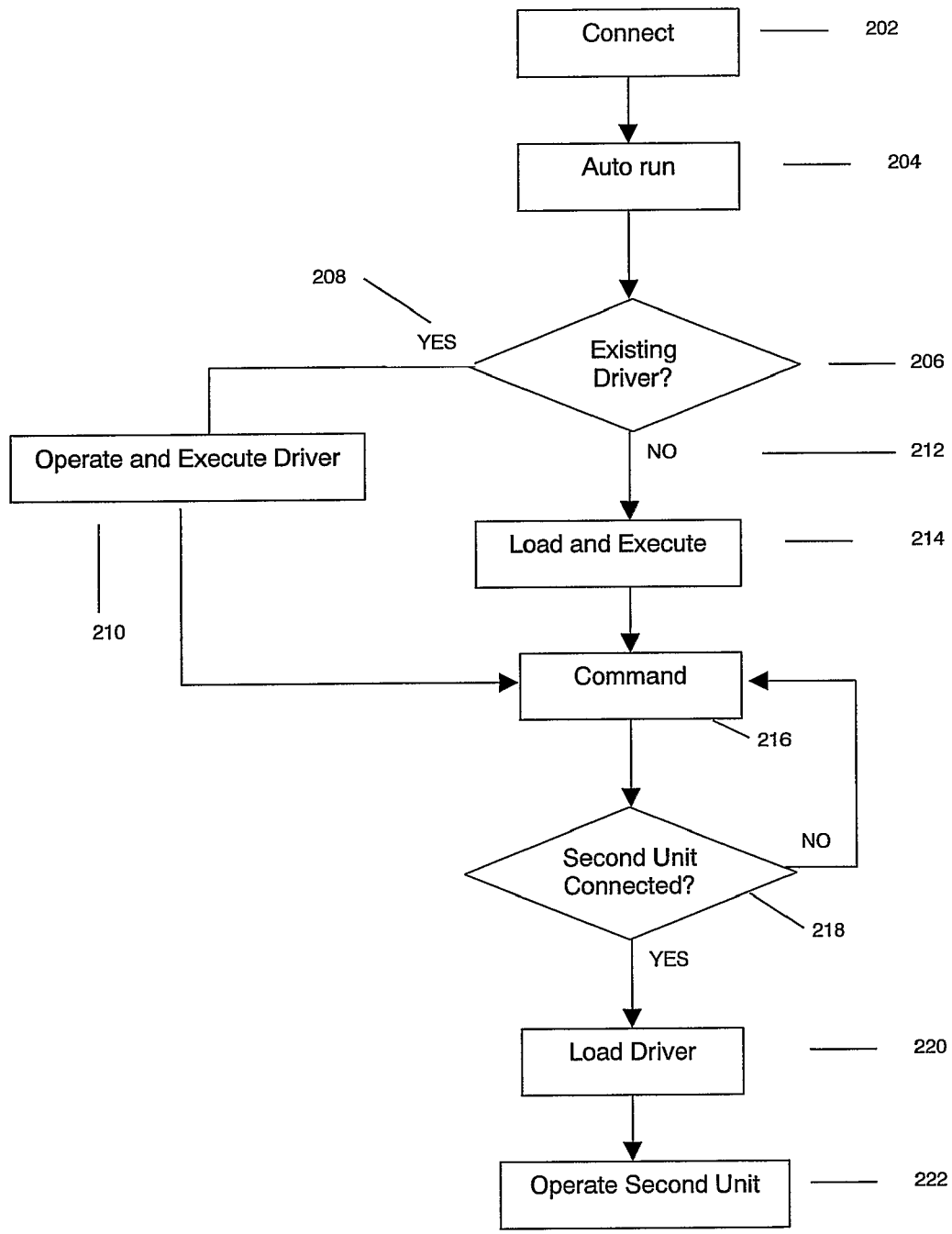
FIG. 5 is a flow chart for the operation of the second embodiment.

As is shown in FIGS. 4 and 5, when the executable program is executed it may install a driver for a second functional unit 34. This is relevant when the memory 28 is separate from the functional unit 24. For example, the first functional unit 24 may be the memory 28 and the second functional unit 34 may be a printer, a scanner, another mass storage device, or otherwise as is listed above. Preferably, the connection of both functional units to host 12 is using the same system, such as, for example, USB, IEEE1394, or wirelessly. Wireless may be by Bluetooth, IEEE 802.11(b) (WiFi), Wi-Max or wireless USB.

After the installation of the driver set up program on host 12, the driver set up program for the second functional unit 34 is executed on host 12 and issues a command through the connector 32 and driver 30 to instruct the device 24 operating system that the installation is complete. After receiving the command, the device 24 operating system may then connect the second functional unit 34 to the operating system of host 12. The first functional unit may be, for example, a CDROM and the second functional 34 unit may be, for example, a smart card reader/writer. Preferably, both units 24, 34 are connected to host 12 via a hub 36.

When the first functional unit 24 is connected to hub 36 (202) only the first functional unit 24 is available to the operating system of host 12. After "autorun" is loaded from first functional device 24 by host 12 and executed on host 12 (204), the host 12 operating system checks for an existing driver (206). If a driver is installed on host 12 (208) it is opened and executed (210). It then proceeds to step (216). If there is no driver installed on host 12 (212), the executable program proceeds with the installation of the driver set up program (214). Upon completion, the set up program issues a command to the first functional unit 24 (216) and the unit 24 then connects the second functional unit to the port on host 12. The operating system of host 12 then detects the unit 34 has been connected (218). The driver for second unit 34 is loaded to host 12 (220), and the second functional unit can be operated by host 12 (222). No user intervention is required for the installation other than the physical connection of units 24, 34.

Figure 6:
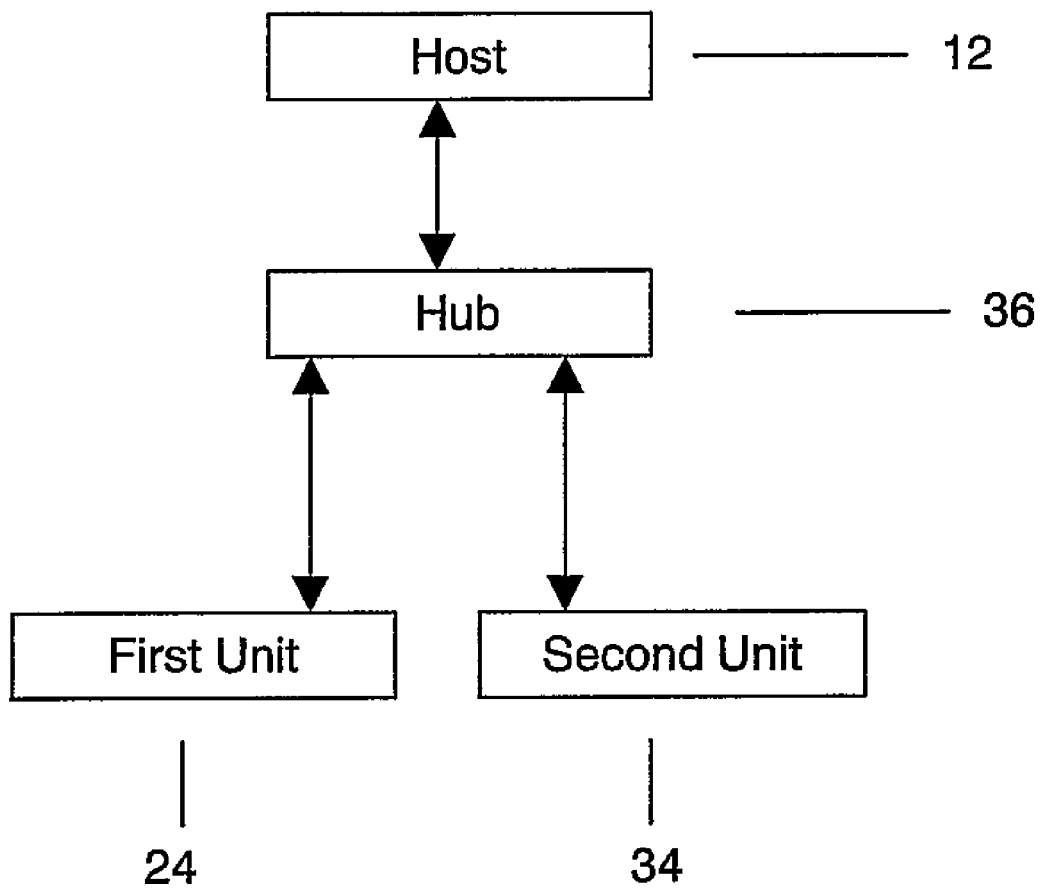
FIG. 6 is a schematic block diagram of a third embodiment.
Figure 7:
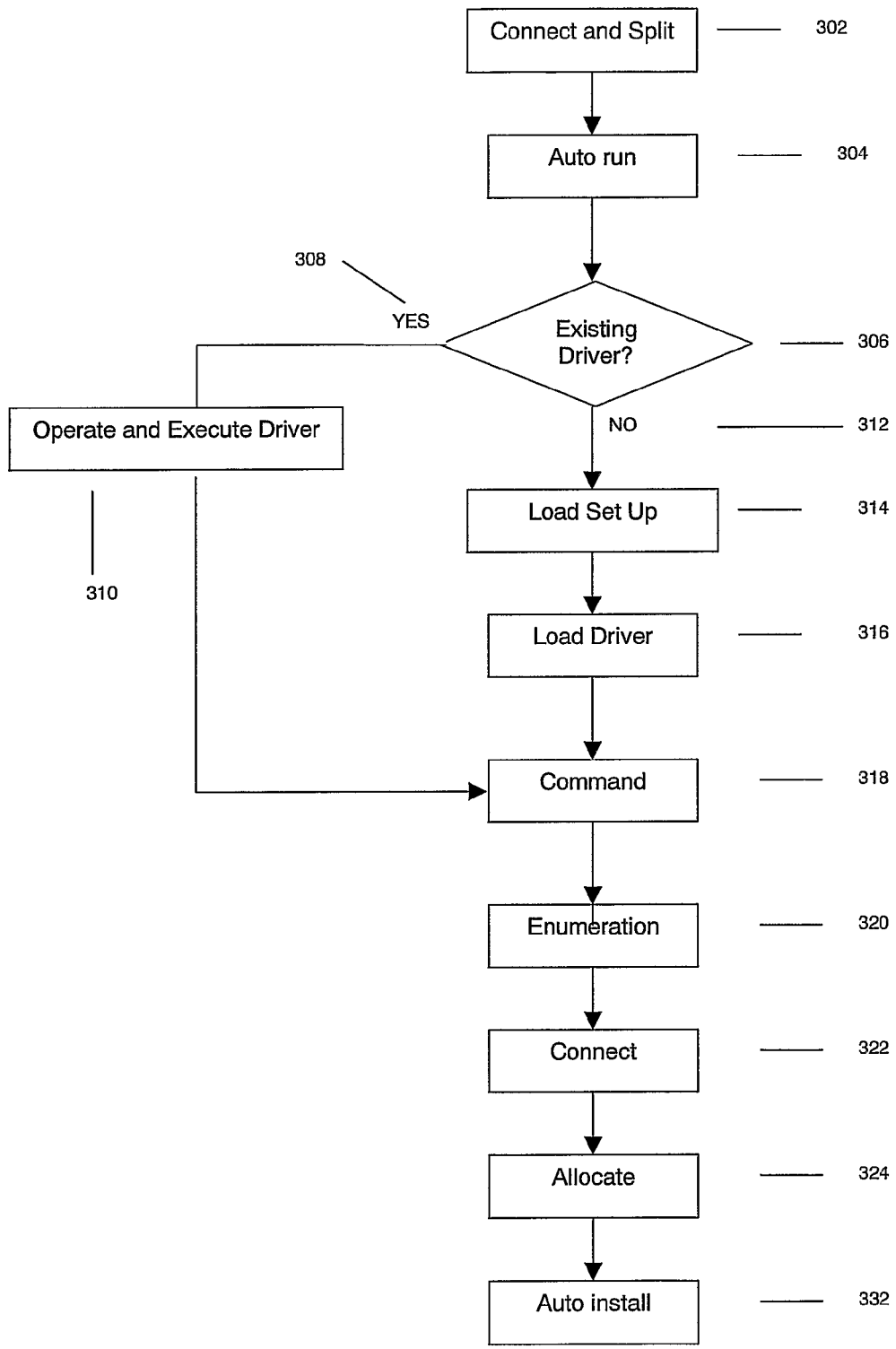
FIG. 7 is a flow chart for the operation of the third embodiment.

FIGS. 6 and 7 show the situation where the second functional unit 34 is also a mass storage device. With the present invention, the operating system of host 12 will support multiple mass storage devices, as detailed in the Mass Storage class specification. For an operating system on host 12 that doesn't support multiple mass storage devices such as those connectable using a device such as a USB hub, the process flow is:

1. physically connect the two units 24, 34 as two logical units (302) by splitting the allocation of one memory unit to two logical unit areas;
2. as the operating system of host 12 does not support multiple units, only the first unit 24 (e.g. a CDROM drive) is visible to the operating system. The "Autorun" then operates (304);
3. the host 12 operating system then checks for an existing driver (306). If a driver is installed on host 12 (308) it is opened and executed (310). It then proceeds to step (318). If there is no driver installed on host 12 (312), the executable program proceeds with the installation of the driver set up program (314);
4. the driver is then loaded and installed (316);
5. when the installation complete, a command is sent to the first unit 24 (318);
6. enumeration is again performed (320) and the two units 24, 34 are determined to be two separate logical units or drives. The first unit 24 will be allocated a first drive letter in the host 12 operating system, and the second unit 34 will be allocated a second letter by the host 12 operating system:
7. the installation of the file system driver then follows by connecting the two units 24,34 as two logical units. Again, this is by splitting one memory unit into two logical unit areas (322); and
8. the first unit 24 is allocated as being, for example, a CDROM drive and the second unit 34 as being a removable drive (324). In this way the second functional unit 34 can be connected at any time after the first functional unit 24. Auto install (332) then operates. In this way the second functional unit 34 can be connected at any time after the first functional unit 24.

Figure 9:
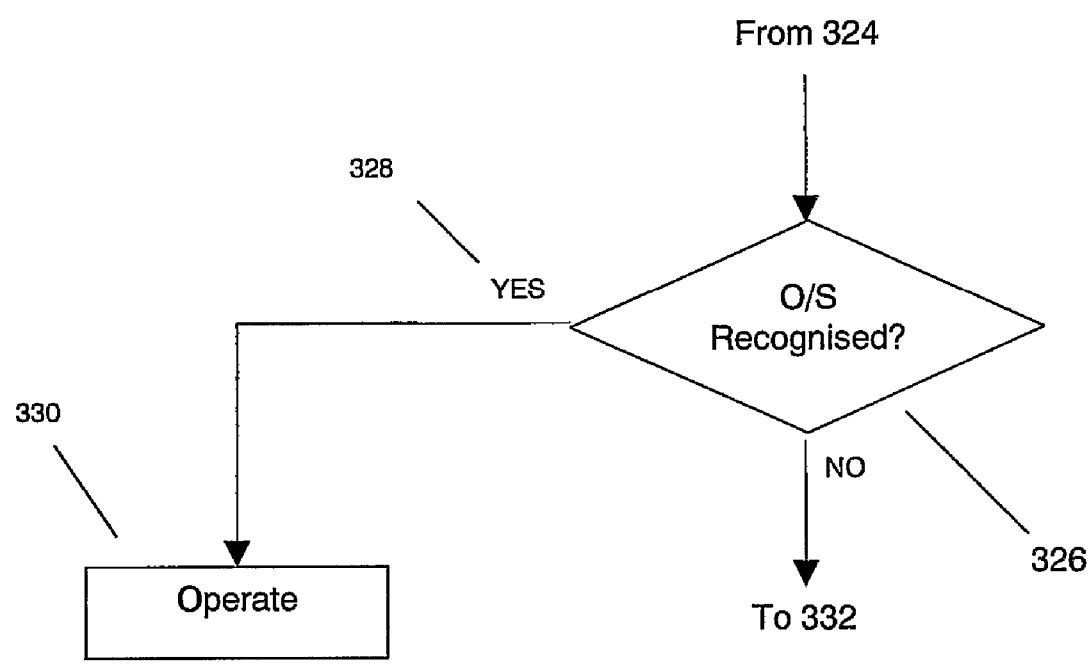
FIG. 9 is a flow chart for the operation of a variant of the third embodiment.

FIG. 9 shows variation. This is relevant when the two functional units 24, 34 are combined without a hub and are thus a composite device. Two functional units 24, units 34 may not report to USB as a composite device if both units 24, 34 have the same interface. The Mass Storage class specification allows the units 24, 34 to report as two logical units. After the allocation (324) a query is raised (326) to determine if the operating system of host 12 supports multiple logical units. If yes (328), the units 24,34 will be recognized and operated as two distinct drives (330). If there is no such support, and if, for example, the second unit 34 is formatted with a different file system to that of host 12 (such as, for example, "Linux" as against "Windows"), the file system of unit 34 is not able to be interpreted by that of host 12 so the connection of the second unit 34 will trigger the automatic installation of the file system driver (332) that forms part of the executable program on first device 24. After the installation of the file system driver, the second unit 34 is accessible from host 12.

In this case both units 24, 34 must be connected at the one time. Remuneration may be required.

Figure 8:
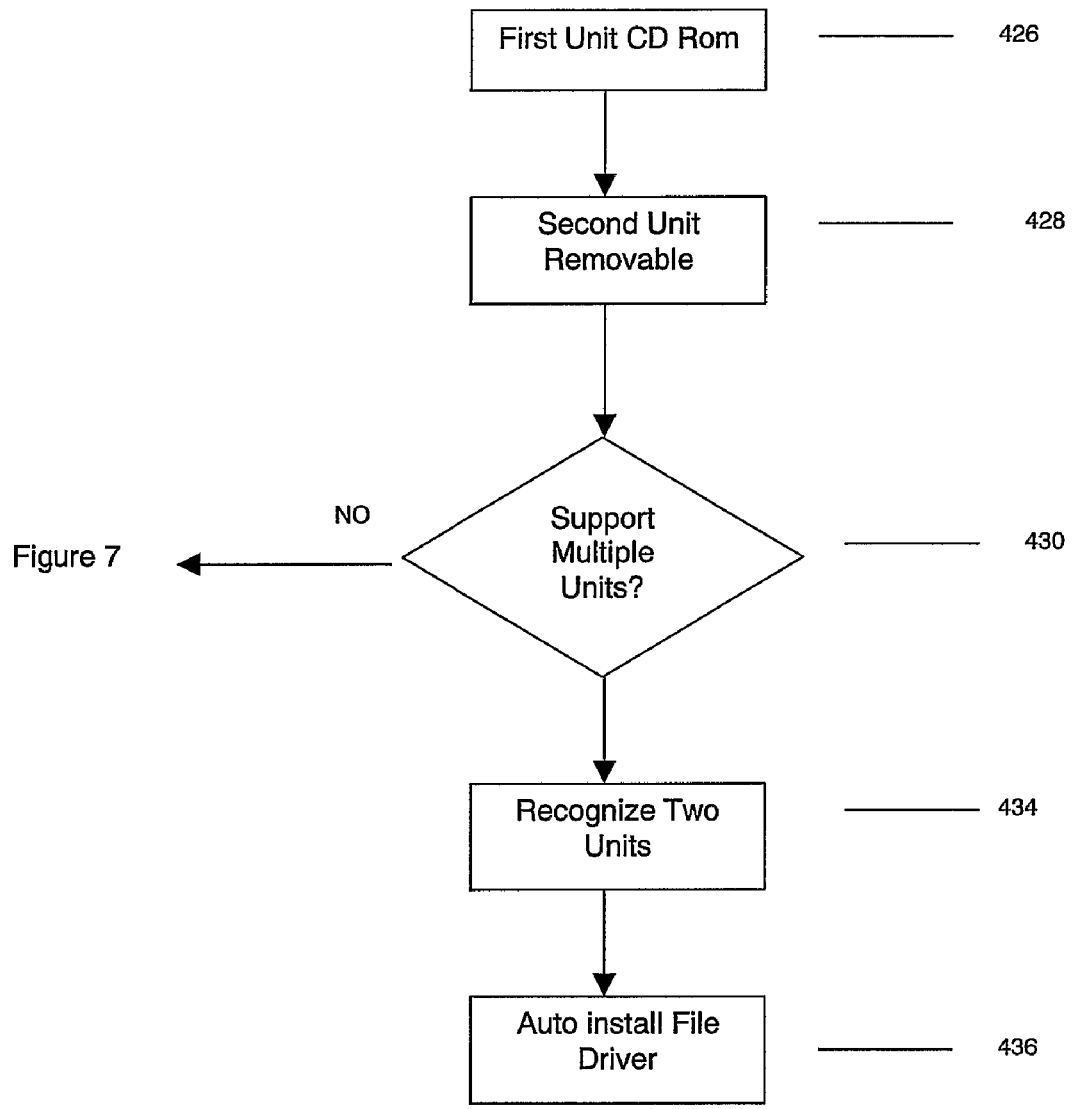
FIG. 8 is a flow chart for the operation of a fourth embodiment.

FIG. 8 shows the installation of a compression and/or encryption driver on a second unit 34 that is a mass storage device. The process flow is similar to that described above in relation to FIGS. 6 and 7 down to and including to process step 8. After that step:

1. the first unit 24 is considered as being, for example, a CDROM drive (426);
2. the second unit 34 is considered as being a removable drive (428);
3. where the operating system of host 12 supports multiple logical units (430, 432), the units 24,34 will be recognized as two distinct drives (434). If not, the process flow described above is performed. If the second unit 34 has a different driver such as, for example, NT file system, Linux file system, and MAC extended file system, encryption, compression, the file system of second unit 34 will not be able to be interpreted by the operating system of host 12. As such, the connection of the second unit 34 will trigger the automatic installation (436) of the file system driver that forms part of the executable program on first device 24; and
4. after the installation of the file system driver, the second unit 34 is accessible from host 12.

Whilst there has been described in the foregoing description preferred embodiments of the present invention, it will be understood by those skilled in the technology that many variations or modifications in details of design or construction may be made without departing from the present invention.

The invention claimed is:

1. A method for automatic loading to a host of a functional unit driver stored as part of an executable program on a memory of a first functional unit, the method comprising:
    (a) physically connecting the first functional unit to the host;
    (b) the first functional unit reporting itself to the host as being a generic storage device to make use of a generic mass storage class driver in the host;
    (c) an operating system of the host reading an autorun file forming part of the executable program to load and execute on the host a driver set up program forming a part of the executable program; and
    (d) using the driver set up program as executed on the host to install and execute the functional unit driver on the host;
wherein the functional unit driver is for the first functional unit and a second functional unit, each functional unit being connectable to the host, both functional units being separate units; and wherein, after the loading and execution of the driver set up program on the host, the driver set up program issues a command to the first functional unit to connect the second functional unit to the host.

2. A method as claimed in claim 1, wherein the first and second functional units are connected to the host using the same system; the system being selected from the group consisting of: USB, IEEE1394, Bluetooth, IEEE 802.11(b), Wi-Max, and wireless USB.

3. A method as claimed in claim 1, wherein upon receipt of the command the first functional unit functionally connects the second functional unit to the host and the operating system of the host detects that the second functional unit has been connected, whereupon the functional unit driver for second functional unit is installed on the host from the first functional unit.

4. A method as claimed in claim 1, wherein when the first and second functional units are physically connected to the host, the host splits an allocation of one memory unit to two logical unit areas.

5. A method as claimed in claim 4, wherein only the first functional unit is visible to the operating system of the host prior to the execution of the driver set up program.

6. A method as claimed in claim 4, wherein after the installation of the functional unit driver is complete, a command is sent to the first functional unit and enumeration is performed; the first and second functional units being determined to be two separate logical units.

7. A method as claimed in claim 6, wherein the first functional unit is allocated a first drive letter in the host, and the second functional unit is allocated a second letter in the host.

8. A method as claimed in claim 3, wherein a file system driver for the second functional unit is automatically installed subsequent to the installation of the functional unit driver, the file system driver also forming a part of the executable program.

9. A method as claimed in claim 8, wherein the first functional unit is allocated by the host as being a first drive and the second functional unit is allocated by the host as being a removable drive.

10. A method as claimed in claim 8, wherein the file system driver is at least one selected from the group consisting of: encryption, compression, NT file system driver, Linux file system driver, and MAC extended file system.

11. A method as claimed in claim 1, wherein the first functional unit is a non-volatile memory device comprising the memory; and the second functional unit is a peripheral device selected from the group consisting of: a monitor, a keyboard, at least one speaker, a mouse, a printer, a removable non-volatile memory device, a digital camera, a digital camera docking station, a projector, a wireless hub, a USB hub, a card reader, an MP3 player, a media player, an external disk drive, a video player, a games console, a scanner, a biometric input device, a musical instrument, and an external sound card.

12. A method as claimed in claim 1, wherein the host is selected from the group consisting of: a personal computer, a server, a laptop computer, a notebook computer, a tablet computer, a personal digital assistant, and a computerized projector.

13. A system for automatic loading to a host of a functional unit driver, the functional unit driver being stored as part of an executable program on a memory of a first functional unit connectable to the host, the executable program further comprising an autorun file for the loading and execution on the host of a driver set up program also forming a part of the executable program; the driver set up program being for execution on the host for the installation and execution of the functional unit driver on the host, wherein the functional unit driver is for the first functional unit and a second functional unit, each functional unit being connectable to the host, both functional units being separate units; and wherein, after the loading and execution of the driver set up program on the host, the driver set up program issues a command to the first functional unit to connect the second functional unit to the host.

14. A system as claimed in claim 13, wherein the first and second functional units are connected to the host using the same system; the system being selected from the group consisting of: USB, IEEE1394, Bluetooth, IEEE 802.11(b), Wi-Max, and wireless USB.

15. A system as claimed in claim 13, wherein after the loading and execution of the driver set up program on the host, the driver set up program issues a command to the first functional unit to functionally connect the second functional unit to the host; and upon receipt of the command the first functional unit functionally connects the second functional unit to the host and the operating system of the host detects that the second functional unit has been connected, whereupon the functional unit driver for second functional unit is installed on the host from the first functional unit.

16. A system as claimed in claim 13, wherein when the first and second functional units are physically connected to the host they are allocated one memory unit split into two logical unit areas.

17. A system as claimed in claim 13, wherein after the installation of the functional unit driver is complete, the first and second functional units are determined to be two separate logical units, the first functional unit being allocated a first drive letter in the host, and the second functional unit being allocated a second letter in the host.

18. A system as claimed in claim 13, wherein the executable program includes a file system driver for the second functional unit, the file system driver being for automatic installation on the host subsequent to the installation of the functional unit driver.

19. A system as claimed in claim 18, wherein the file system driver is at least one selected from the group consisting of: encryption, compression, NT file system driver, Linux file system driver, and MAC extended file system driver.

20. A system as claimed in claim 13, wherein the first functional unit is a non-volatile memory device comprising the memory.

21. A system as claimed in claim 13, wherein the second functional unit is a peripheral device selected from the group consisting of: a monitor, a keyboard, at least one speaker, a mouse, a printer, a removable non-volatile memory device, a digital camera, a digital camera docking station, a projector, a wireless hub, a USB hub, a card reader, an MP3 player, a media player, an external disk drive, a video player, a games console, a scanner, a biometric input device, a musical instrument, and an external sound card.

22. A system as claimed in claim 13, wherein the host is selected from the group consisting of: a personal computer, a server, a laptop computer, a notebook computer, a tablet computer, a personal digital assistant, and a computerized projector.

23. A removable non-volatile memory device for attachment to a host, the removable memory non-volatile device comprising a computer readable medium comprising a computer program code that is configured to cause at least one processor of the host to execute one or more functions to perform the method of claim 1.

* * * * *